(12) United States Patent
Lahn

(10) Patent No.: US 9,027,950 B2
(45) Date of Patent: *May 12, 2015

(54) ANTI-RATTLE HITCH ASSEMBLY

(71) Applicant: Kevin Lahn, Poulsbo, WA (US)

(72) Inventor: Kevin Lahn, Poulsbo, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/092,865

(22) Filed: Nov. 27, 2013

(65) Prior Publication Data

US 2014/0084568 A1 Mar. 27, 2014

Related U.S. Application Data

(63) Continuation of application No. 12/777,163, filed on May 10, 2010, now Pat. No. 8,596,664.

(60) Provisional application No. 61/177,203, filed on May 11, 2009.

(51) Int. Cl.
| | |
|---|---|
| *B60D 1/04* | (2006.01) |
| *B60D 1/24* | (2006.01) |
| *B60D 1/06* | (2006.01) |
| *B60D 1/52* | (2006.01) |

(52) U.S. Cl.
CPC ........ *B60D 1/241* (2013.01); *B60D 1/06* (2013.01); *B60D 1/52* (2013.01)

(58) Field of Classification Search
CPC .......................................................... B01D 1/52
USPC .......................................... 280/495, 504, 506
See application file for complete search history.

(56) References Cited

U.S. PATENT DOCUMENTS

| | | | |
|---|---|---|---|
| 1,323,455 A * | 12/1919 | Crum | 280/416 |
| 2,280,662 A | 4/1942 | Pawsat | |
| 2,940,776 A * | 6/1960 | Curtis | 280/446.1 |
| 3,194,467 A | 7/1965 | Goonan | |
| 3,528,691 A * | 9/1970 | Matich, Jr. | 403/356 |
| 3,971,186 A | 7/1976 | Havelka | |
| 4,078,276 A * | 3/1978 | Nunes | 16/271 |
| 4,398,743 A | 8/1983 | Belsky | |
| 4,678,199 A * | 7/1987 | Dickmann | 280/491.5 |
| 4,746,138 A * | 5/1988 | James | 280/487 |
| 5,181,822 A * | 1/1993 | Allsop et al. | 414/462 |
| 5,244,133 A | 9/1993 | Abbott | |
| 5,322,315 A * | 6/1994 | Carsten | 280/479.2 |

(Continued)

OTHER PUBLICATIONS

International Search Report mailed Feb. 1, 2011, issued in corresponding International Application No. PCT/US2010/034269, filed May 10, 2010, 3 pages.

(Continued)

*Primary Examiner* — Joseph Rocca
*Assistant Examiner* — Conan Duda
(74) *Attorney, Agent, or Firm* — Christensen O'Connor Johnson Kindness PLLC

(57) ABSTRACT

An anti-rattle hitch (100) includes a tubular insert (102) that is configured to be inserted into a receiver (90). A wedge mechanism comprising a first wedge member (112) and a second wedge member (114) are disposed in the insert, and have slidably engaged angled faces. The second wedge member includes one or more pistons that extend through piston (110) apertures in the insert such that the longitudinal position of the second wedge member is fixed. An adjustment member (120) adjusts the position of the first wedge member, thereby adjusting the piston position which can be biased against the receiver.

10 Claims, 5 Drawing Sheets

(56) References Cited

U.S. PATENT DOCUMENTS

| | | | |
|---|---|---|---|
| 5,333,888 A | 8/1994 | Ball | |
| 5,344,175 A * | 9/1994 | Speer | 280/506 |
| 5,372,287 A * | 12/1994 | Deguevara | 224/510 |
| 5,380,030 A * | 1/1995 | Gullickson | 280/486 |
| 5,423,566 A | 6/1995 | Warrington | |
| 5,449,100 A * | 9/1995 | Eckhart | 224/509 |
| 5,547,116 A * | 8/1996 | Eckhart | 224/509 |
| 5,593,172 A | 1/1997 | Breslin | |
| 5,615,904 A * | 4/1997 | Van Dusen et al. | 280/506 |
| 5,685,686 A * | 11/1997 | Burns | 414/462 |
| 5,690,260 A | 11/1997 | Aikins | |
| 5,730,456 A * | 3/1998 | Bowers | 280/507 |
| 5,735,539 A | 4/1998 | Kravitz | |
| 5,806,872 A * | 9/1998 | Szczypski | 280/479.2 |
| 5,823,560 A * | 10/1998 | Van Vleet | 280/484 |
| 6,010,144 A | 1/2000 | Breslin | |
| 6,068,281 A * | 5/2000 | Szczypski | 280/479.2 |
| 6,105,989 A | 8/2000 | Linger | |
| 6,131,938 A | 10/2000 | Speer | |
| 6,142,502 A | 11/2000 | Breslin | |
| 6,334,561 B1 * | 1/2002 | Cole | 224/521 |
| 6,336,580 B1 | 1/2002 | Allen | |
| 6,357,780 B1 | 3/2002 | Young | |
| 6,382,656 B1 | 5/2002 | Johnson, Jr. | |
| 6,390,489 B1 * | 5/2002 | Friesen | 280/504 |
| 6,467,789 B1 * | 10/2002 | Schedler et al. | 280/408 |
| 6,536,794 B2 | 3/2003 | Hancock | |
| 6,598,897 B1 | 7/2003 | Patti | |
| 6,688,804 B1 | 2/2004 | Parent | |
| 6,733,029 B2 * | 5/2004 | McCoy et al. | 280/506 |
| 6,834,879 B1 * | 12/2004 | Lorman | 280/506 |
| 6,835,021 B1 | 12/2004 | McMillan | |
| 6,942,237 B1 * | 9/2005 | Depault | 280/491.5 |
| 6,945,550 B2 * | 9/2005 | Williams | 280/506 |
| 6,951,287 B1 * | 10/2005 | Randazzo | 211/17 |
| 6,957,825 B2 * | 10/2005 | Peters | 280/483 |
| 6,974,147 B1 | 12/2005 | Kolda | |
| 7,004,491 B1 | 2/2006 | Allsop | |
| 7,093,845 B1 | 8/2006 | Fast | |
| 7,195,269 B2 | 3/2007 | Tambornino | |
| 7,197,806 B2 * | 4/2007 | Boudreaux et al. | 29/434 |
| 7,448,640 B2 * | 11/2008 | Weaver | 280/507 |
| 7,600,774 B1 * | 10/2009 | Speer et al. | 280/506 |
| 7,726,681 B2 * | 6/2010 | McKendry | 280/506 |
| 7,740,267 B2 * | 6/2010 | Kirtland | 280/506 |
| 7,802,807 B2 * | 9/2010 | Blakley | 280/506 |
| 7,806,425 B2 * | 10/2010 | Chang | 280/507 |
| 7,823,904 B2 * | 11/2010 | Coy | 280/506 |
| 7,918,475 B2 * | 4/2011 | Musselman | 280/491.5 |
| 8,020,828 B2 * | 9/2011 | Carnevali | 248/412 |
| 8,079,612 B1 * | 12/2011 | Tambornino | 280/506 |
| 8,079,613 B2 * | 12/2011 | Williams | 280/515 |
| 8,141,760 B2 * | 3/2012 | Kuschmeader et al. | 224/497 |
| 8,596,664 B2 * | 12/2013 | Lahn | 280/506 |
| 2002/0145270 A1 * | 10/2002 | Williams | 280/506 |
| 2004/0262883 A1 * | 12/2004 | Kerins et al. | 280/483 |
| 2005/0115792 A1 | 6/2005 | Geyer | |
| 2006/0186638 A1 * | 8/2006 | Varner | 280/506 |
| 2006/0208456 A1 | 9/2006 | Weaver | |
| 2006/0255562 A1 | 11/2006 | Lantaigne | |
| 2006/0290103 A1 | 12/2006 | Kottke | |
| 2007/0138762 A1 * | 6/2007 | Dietz | 280/506 |
| 2009/0230656 A1 | 9/2009 | Blakley | |
| 2010/0096424 A1 | 4/2010 | Kuschmeader | |
| 2010/0201102 A1 * | 8/2010 | Weaver | 280/506 |
| 2010/0283225 A1 * | 11/2010 | Lahn | 280/506 |

OTHER PUBLICATIONS

International Written Opinion mailed Feb. 1, 2011, issued in corresponding International Application No. PCT/US2010/034269, filed May 10, 2010, 4 pages.

* cited by examiner

ANTI-RATTLE HITCH ASSEMBLY

CROSS-REFERENCE TO RELATED APPLICATION

This application is a continuation of patent application Ser. No. 12/777,163, filed May 10, 2010, which claims the benefit of Provisional Application No. 61/177,203, filed May 11, 2009, the entire disclosures of which are hereby incorporated by reference herein.

BACKGROUND

Hitch assemblies provide a connection between a device, such as a trailer, ski rack, or the like, and a vehicle. A receiver-type hitch assembly typically includes a receiver that is attached to the frame of a vehicle and a hitch that is removably inserted into the receiver. The hitch may include, for example, a conventional trailer ball that is sized to be engaged by a ball receiver on a trailer. Alternatively, the hitch may comprise a portion of a carrier, for example, a bicycle carrier, ski carrier, cargo carrier, or the like. The hitch may include additional or alternative mechanisms for engaging an apparatus to be carried or towed. A conventional SAE receiver typically comprises a rectangular tube with a rearwardly facing square opening that is 1.25 inches (32 mm), 2.0 inches (51 mm) or 2.5 inches (64 mm) square.

The insertable hitch includes a shaft having an outer dimension that is somewhat smaller than the inner dimension of the receiver so that the hitch can be relatively easily inserted into the receiver. A hitch pin (or locking pin) is inserted through holes provided in the side walls of the receiver and alignable holes in the hitch. The locking pin may be secured, for example, with a retaining clip to prevent the locking pin from inadvertently coming out during use. Exemplary prior art hitch assemblies include those disclosed in U.S. Pat. No. 6,105,989, to Linger, which is hereby incorporated by reference in its entirety, and in U.S. Pat. No. 6,382,656, to Johnson, Jr., which is hereby incorporated by reference in its entirety.

Detachable hitches are preferred for many applications. For example, a user may use one hitch for towing loads and other hitches for attaching bicycle racks, ski racks, carriers, or the like, to the vehicle. Also, hitches typically extend beyond the rear of the towing vehicle to enable attachment of a trailer to the hitch with clearance for the trailer and towing vehicle to articulate relative to each other during towing. The protruding hitch with a ball attachment can be bothersome and dangerous when the vehicle is used without the trailer attached; therefore, it is beneficial to be able to remove the hitch when it is not needed.

However, as noted above the hitch shaft is smaller than the receiver opening, and so the fit between the hitch and the receiver includes some play between the receiver and the walls of the hitch shaft. The relatively loose fit permits undesirable relative movement or play between the receiver and the hitch, which can be noisy and annoying. The play between the walls of the receiver and hitch can cause clanging noises and vibrations that can be felt by operators and passengers within the towing vehicle. The play may also be magnified by the lever arm of the hitch so that it is felt more strongly by the trailer. That same play can also increase wear and stress on various parts of the mechanisms attaching the trailer to the towing vehicle, leading to undesirable wear and fatigue.

The disadvantages of the relatively loose fit between the receiver and hitch coupling have been recognized by others. For example, in U.S. Pat. No. 6,974,147, to Kolda, which is hereby incorporated by reference, a mechanism for preventing relative movement between these members is disclosed, wherein the tow bar or mounting member is provided with a cam that is adjustably urged into the mounting member and abuts the hitch pin. The adjustment mechanism causes the cam to rotate, extending through a slot in the mounting member, and is urged against the receiver. However, the mechanism has the disadvantage that it presses against the receiver at a single position and against the opposite side of the mounting member at a single position, in addition to the hitch pin, which may still permit some movement between the mounting member and receiver.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An anti-rattle hitch is disclosed having an insert that is configured to be inserted into a receiver. For clarity, the hitch will be described with directional references, such as "upper" and "lower," although it will be appreciated that the particular orientation may be different. The insert has an upper wall with a piston aperture, a lower wall, and two side walls. A lower wedge block and an upper wedge block are disposed in the insert. The lower wedge block has a lower surface that slidably engages the lower wall of the insert, and an upper angled surface. The upper wedge block has a lower angled surface that slidably engages the lower wedge block, and a piston that extends through the piston aperture, such that the longitudinal position of the upper wedge block is constrained by the piston. An adjustment member engages the lower wedge block, extends out of the insert, and is operable to adjust the longitudinal position of the lower wedge block, thereby adjusting the transverse position of the upper wedge block. This configuration allows adjusting the position of the piston that extends out of the insert. The hitch is configured such that the piston may be adjusted to press against the receiver, thereby locking the hitch therein and avoiding play therebetween.

In an embodiment of the invention, the piston comprises a cylinder that is attached to the upper wedge member with a screw.

In an embodiment of the invention, a second piston aperture is provided through the insert, and a second piston is attached to the upper wedge block and extends through the second piston aperture.

In an embodiment of the invention, the hitch includes a ball mount member that is configured to support a tow ball.

In an embodiment of the invention, the adjustment member is a threaded rod that threadably engages the first wedge member and a head that extends out of the tubular insert.

In an embodiment of the invention, the adjustment member includes a security feature, such as a lock or a keyed head, that hinders operation of the adjustment member without a corresponding tool.

In an embodiment of the invention, a low friction panel is provided between the angled faces and may comprise an ultrahigh molecular weight polyethylene.

In an embodiment of the invention, the wedge blocks further include second angled faces that are slidably engaged.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
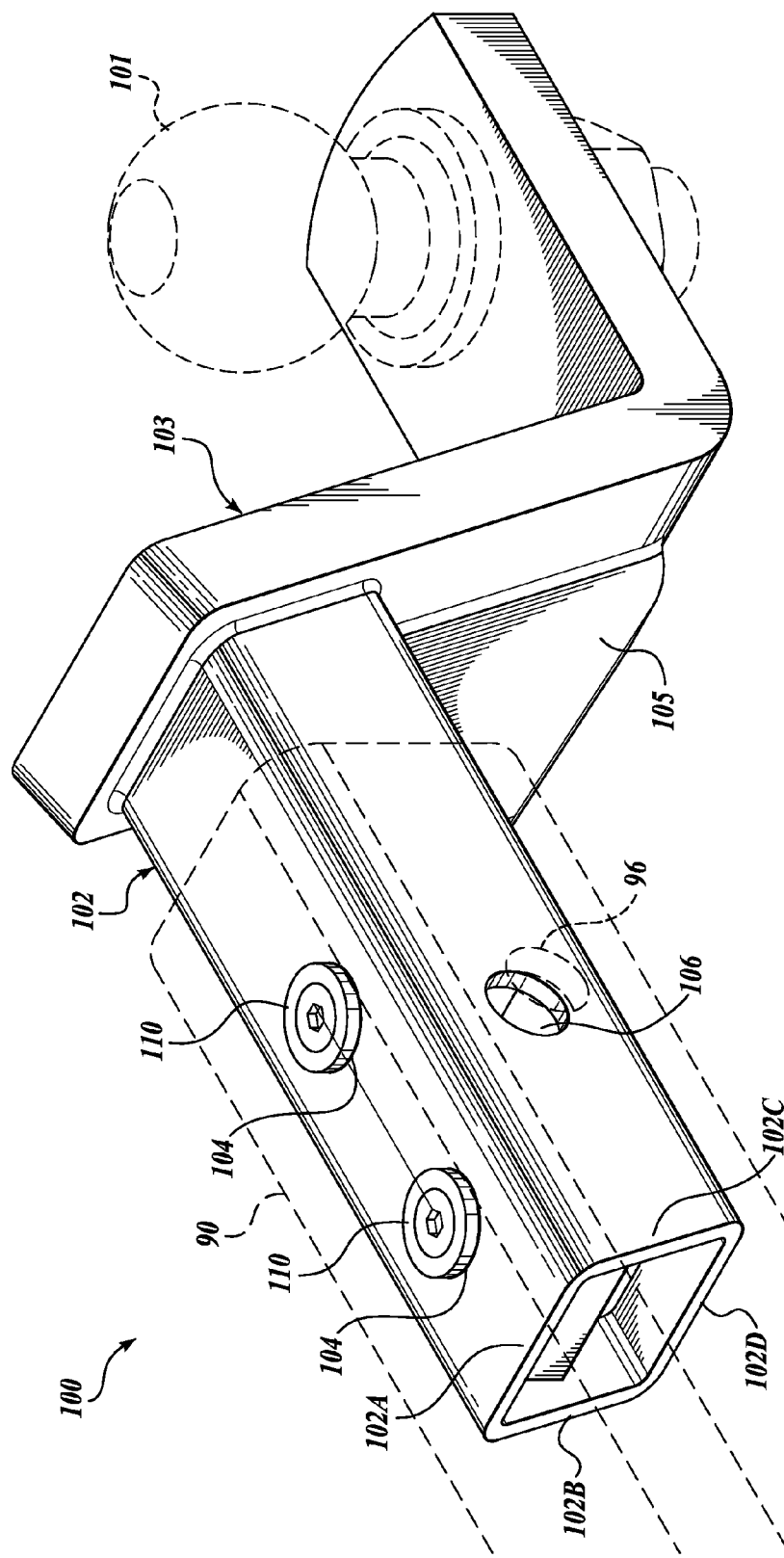
FIG. 1A is a perspective view of a hitch assembly in accordance with the present invention.
Figure 1B:
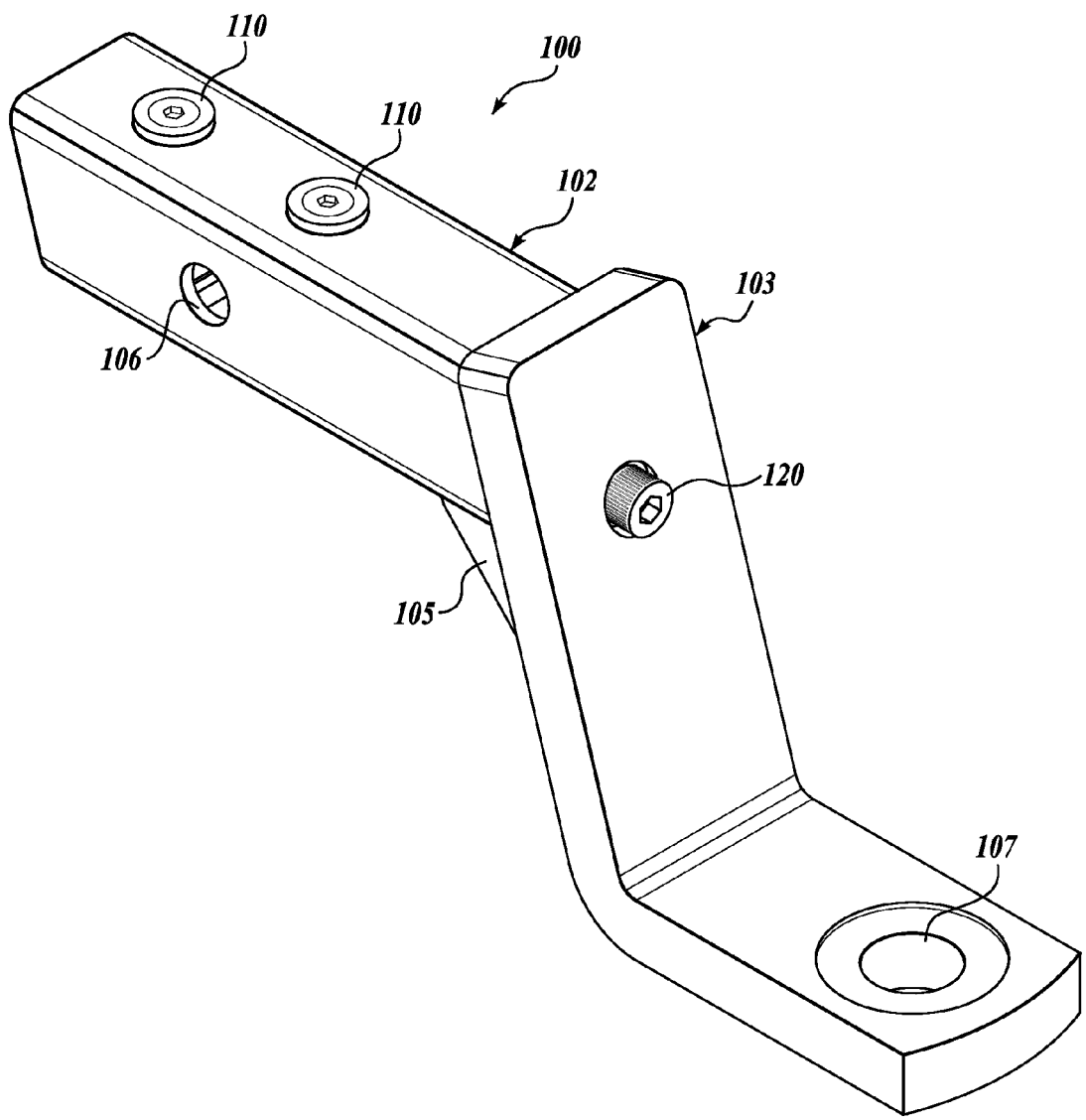
FIG. 1B is another perspective view of the hitch shown in FIG. 1A.

FIG. 1A is a perspective view of a hitch assembly 100 in accordance with the present invention and showing in phantom a receiver 90 and a tow ball 101. A three-quarter rear perspective view of the hitch assembly 100 is shown in FIG. 1B. The hitch assembly 100 includes a tubular insert 102 that is sized and configured to be inserted into a receiver 90 to cooperatively comprise a receiver-type hitch assembly. The tubular insert 102 is a substantially square tube. In an exemplary embodiment the tubular insert 102 is sized to engage an SAE standard receiver having a square opening that is 1.25 inches (32 mm), 2.0 inches (51 mm) or 2.5 inches (64 mm) on each side. The tubular insert 102 is fixedly attached to a structural member, for example a ball mount 103 that is configured to support a tow ball 101. For example, the tow ball 101 (FIG. 1A) may bolt through aperture 107 (FIG. 1B) in the ball mount 103. An optional gusset plate 105 reinforces the connection between the tubular insert 102 and the ball mount 103

The tubular insert 102 includes a first wall 102A (in this case the upper wall), oppositely disposed second and third walls 102B, 102C (e.g., side walls), and a fourth wall 102D (e.g., lower wall) disposed opposite the first wall 102A. As seen most clearly in the exploded view of FIG. 2, the first wall 102A includes a pair of longitudinally spaced piston apertures 104. The second and third walls 102B, 102C each have a locking pin aperture 106 (one visible), which are aligned to receive a conventional locking pin (not shown). Corresponding locking pin apertures 96 are provided through the receiver 90. Also visible in FIG. 1A are a pair of adjustable pistons 110, which are discussed in more detail below.

Figure 2:
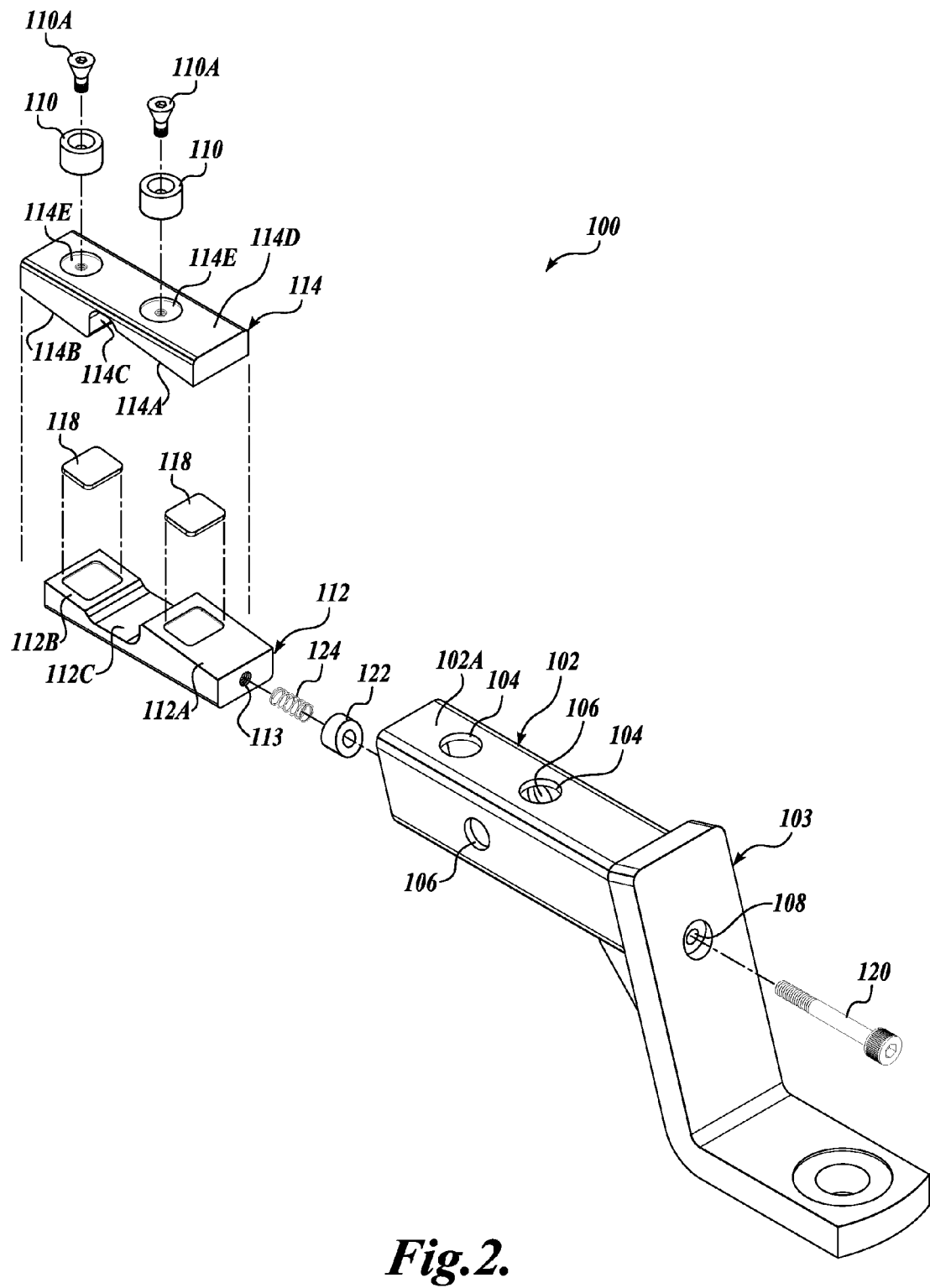
FIG. 2 is an exploded view of the hitch assembly shown in FIG. 1A.
Figure 3:
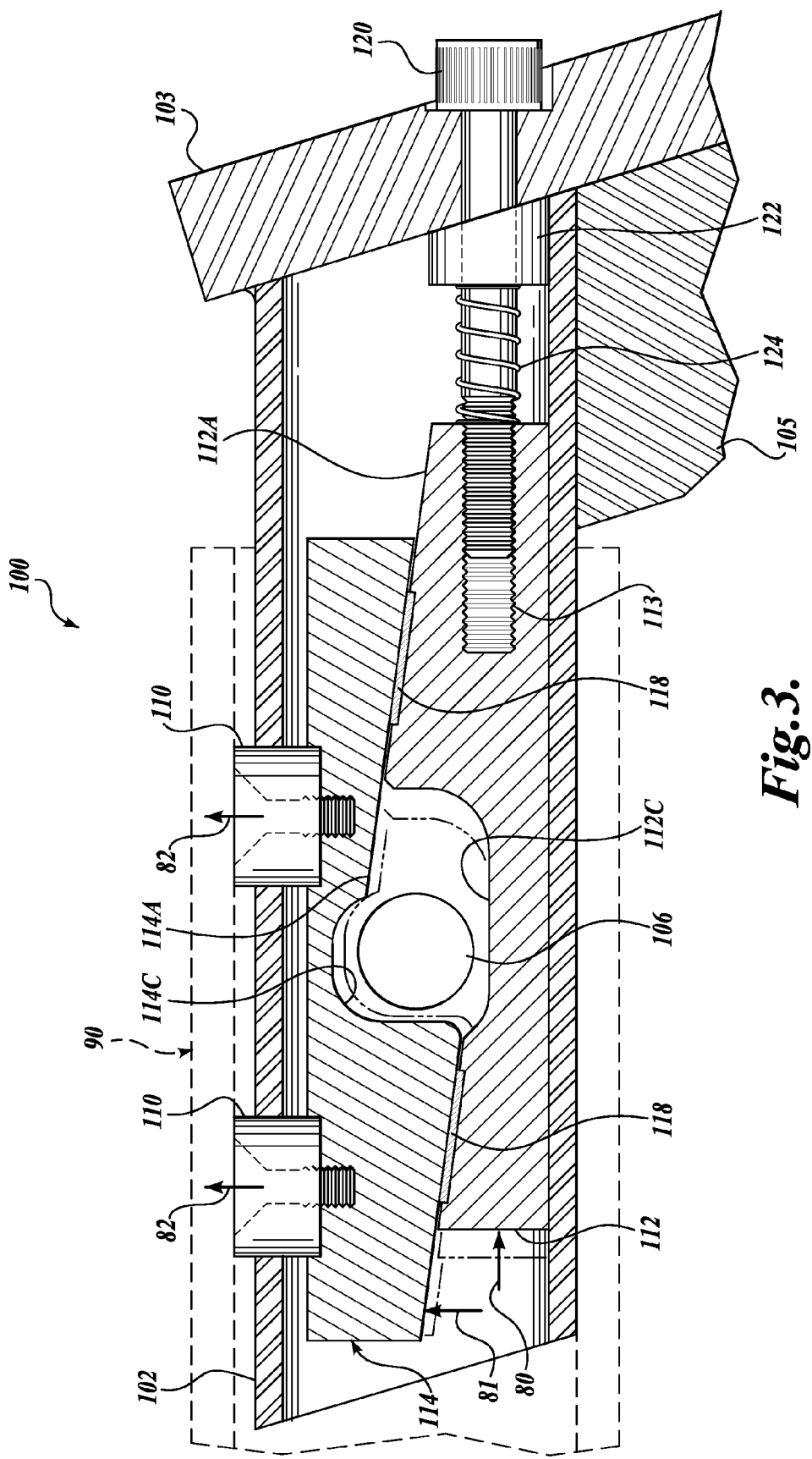
FIG. 3 is a cross-sectional view of the hitch assembly shown in FIG. 1A.

FIG. 2 shows an exploded view of the hitch 100. Refer also to FIG. 3, which shows a longitudinal cross-sectional view of the hitch 100, taken through a centerline of the tubular member 102. A sliding wedge mechanism is disposed in the tubular insert 102 and is operable to selectively tighten the hitch 100 within the receiver 90, thereby reducing or eliminating play between the hitch 100 and the receiver 90. The wedge mechanism includes a first wedge member 112, defining a first angled face 112A, a second angled face 112B and a recess 112C therebetween. A threaded aperture 113 is oriented longitudinally from a proximal end of the first wedge member 112.

A second wedge member 114 is positioned generally adjacent the first wedge member 112 and includes a first angled face 114A, a second angled face 114B, and a recess 114C therebetween. When assembled, the first wedge member first angled face 112A is disposed adjacent the second wedge member first angled face 114A, and the first wedge member second angled face 112B is disposed adjacent the second wedge member second angled face 114B to slidably engage the first wedge member 112 when the hitch 100 is assembled.

The pistons 110 are attached to an upper face 114D of the upper block 114. In the present embodiment the attachment is accomplished with flathead fasteners 110A, although other attachment means may be used, including for example by forming a post (threaded or unthreaded) on the bottom of the pistons, with corresponding apertures in the second wedge member 114. Optionally, recesses 114E are provided in which the pistons 110 are securely seated.

A threaded adjustment fastener 120 extends through an aperture 108 in the ball mount 103 and into the tubular insert 102 to threadably engage the first wedge member 112 threaded aperture 113. Optionally, an angled spacer 122 and spring, or other biasing member 124, are also provided. It will now be appreciated that the longitudinal position of the second wedge member 114 is constrained within the tubular insert 102 by the pistons 110 extending through the piston apertures 104. The position of the first wedge member 112 is adjusted with the adjustable fastener 120.

The first and second wedge members 112, 114 angled faces 112A, 114A, and 112B, 114B are configured to slidably engage. In this embodiment, low friction pads 118 are provided between the respective angled faces. For example, low friction pads may comprise polymeric material. In a current embodiment, the low friction pads comprise ultrahigh molecular weight polyethylene, which has a very low coefficient of friction, is self-lubricating, and is highly resistant to abrasion.

The wedge member recesses 112C, 114C are sized and shaped to cooperatively define an opening therebetween that is aligned with the locking pin apertures 106 in the tubular insert 102 (which are also alignable with corresponding apertures 96 in the receiver 90), such that the wedge members 112, 114 will not interfere with the locking pin during use.

Figure 4:
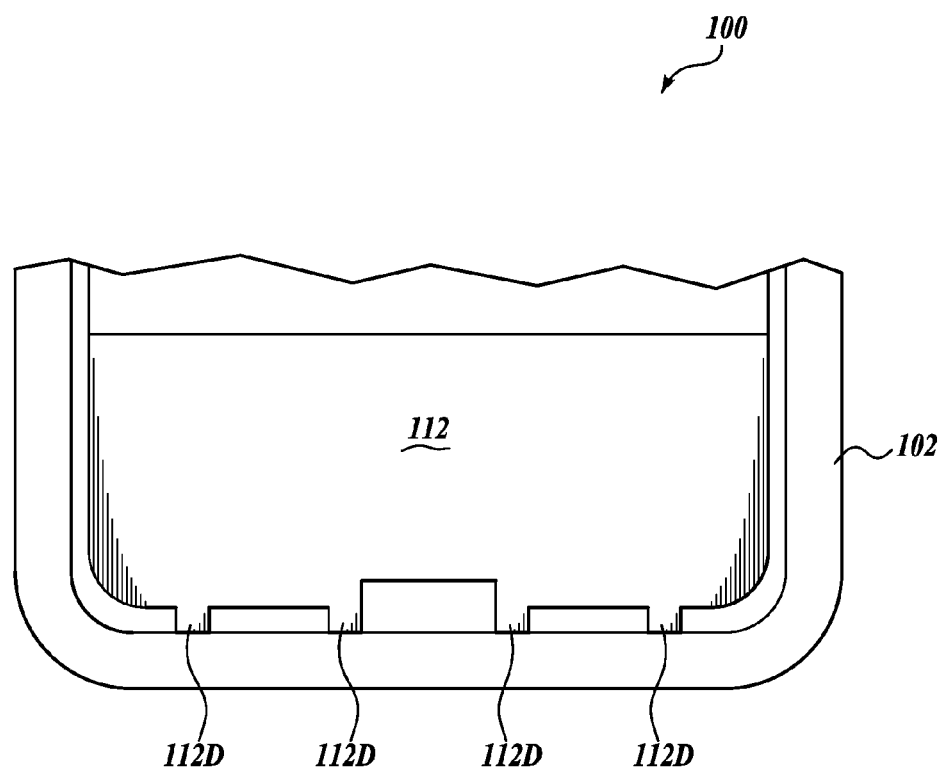
FIG. 4 is a fragmentary end view of the hitch shown in FIG. 1A.

A fragmentary end view of the hitch 100 is shown in FIG. 4, showing the first wedge member 112 and the lower portion of the tubular insert 102. In this embodiment, the lower surface of the first wedge member 112 is provided with longitudinal ribs 112D to reduce friction between the first wedge member 112 and the tubular member 102, and thereby facilitate adjustment of the wedge mechanism. It is further contemplated that a low friction panel or other friction-reducing mechanism (not shown) may be provided between the first wedge member 112 and the tubular insert 102.

In the present embodiment, the hitch 100 is assembled by inserting the adjustment member 120 through the aperture 108 in the ball mount 103 and inserting the angled spacer 122 and spring 124 through the open end of the tubular insert 102 to slide over the adjustment member 120. The first and second wedge members 112, 114 are inserted together into the tubular insert 102 and the adjustment member 120 engages the threaded aperture 113. The second wedge member is then positioned such that the recesses 114E are aligned with the piston apertures 104, and the pistons 110 are inserted through the respective piston apertures 104 and attached to the second wedge member 114.

To use the hitch 100, the adjustment member 120 is adjusted such that the pistons 100 are approximately flush with the first wall 102A of the tubular insert 102. The hitch 100 may then be inserted into the receiver 90. The adjustment member 114 is then adjusted such that the first wedge member 112 is drawn to the right in FIG. 3, as indicated by arrow 80. The second wedge member 114 is restrained from moving longitudinally by the pistons 110. Due to the angled faced of the first and second wedge members 112, 114, the second wedge member 114 moves upwardly as indicated by arrow 81, such that the pistons 110 move upwardly to engage and press against the receiver 90, as indicated by arrows 82. The locking pin (not shown) is then inserted through the locking pin apertures 96, 106.

To disengage the hitch 100 from the receiver 90, the adjustment member 120 is adjusted in the reverse direction. After removing the locking pin, the adjustment member 120 is adjusted in the opposite direction. The biasing spring 124 aids in moving the first wedge member to the left in FIG. 3, and the pistons 110 disengage from the receiver 90, such that the tubular insert 102 can be readily pulled out of the receiver 90.

It is also contemplated that the adjustment member 120 may include one or more security features, such as a lock or the like. In an embodiment the adjustment member incorporates an unusual head shape, such that the adjustment member is not easily adjusted without a corresponding, suitably keyed tool (not shown). This security feature provides the additional advantage that once the hitch 100 is securely locked to the receiver 90, the hitch 100 cannot be easily removed from the vehicle without the special tool. This will provide the additional advantage of protection from theft.

Although not required for the present invention, in an exemplary embodiment the first and second wedge members 112, 114 may be formed from a relatively soft material such as aluminum or a composite material, and the tubular insert 102 and ball mount 103 may be formed from a conventional rugged material such as steel.

As discussed above, the hitch 100 may alternatively be configured as a portion of any hitchable device, for example, a bicycle carrier, ski carrier, or the like. Also, although the current hitch 100 includes two generally cylindrical pistons 110 that engage the receiver 90, it would be straightforward to change the number of pistons and/or to use other shapes or sizes of members for engaging the receiver. For example, it is contemplated that the second wedge member 114 may be provided with four smaller pistons or protrusions disposed generally at the corners of the second wedge member 114, with corresponding apertures in the tubular sleeve member 102.

Although a currently preferred embodiment has been described, many modifications may be made to this embodiment without departing from the present invention. For example, it is contemplated that the first and second wedge members 112, 114 may be formed from some alternate material, such as a polymer or composite material. Also, where threadable connections are shown, it will be appreciated that other connection means, as are known in the art, may alternatively be used. It is also contemplated that a cover or other blocking means may be provided on the end of the tubular sleeve member 102, to deter foreign matter from entering the member.

While illustrative embodiments have been illustrated and described, it will be appreciated that various changes can be made therein without departing from the spirit and scope of the invention.

The embodiments of the invention in which an exclusive property or privilege is claimed are defined as follows:

1. A hitch component configured to be removably retained by a receiver wherein the receiver has a receiver aperture, the hitch component comprising:
    a tube having a pair of aligned hitch apertures, wherein the tube is configured to be inserted into the receiver with the hitch apertures aligned with the receiver aperture, the tube further comprising two piston apertures;
    a longitudinally adjustable wedge block disposed in the tube and comprising a first wedge surface, a second wedge surface, and a first recess between the first wedge surface and the second wedge surface;
    a transversely movable wedge block disposed in the tube and comprising a third wedge surface slidably engaging the first wedge surface, a fourth wedge surface slidably engaging the second wedge surface, and a second recess between the third wedge surface and the fourth wedge surface, wherein the first and second recesses cooperatively define a channel between the pair of aligned hitch apertures;
    a first piston attached to the transversely movable wedge block opposite the third wedge surface such that the first piston extends through a first one of the two piston apertures;
    a second piston attached to the transversely movable wedge block opposite the fourth wedge surface such that the second piston extends through a second one of the two piston apertures;
    a ball mount fixedly attached to a distal end of the tube, the ball mount having an aperture therethrough that provides access into the tube;
    a spring that biases the longitudinally adjustable wedge member away from the ball mount; and
    a bolt that extends through the ball mount aperture and threadably engages the longitudinally adjustable wedge block;
    wherein the bolt is configured to selectively adjust the position of the longitudinally adjustable wedge block such that the transversely movable wedge block extends the first and second pistons to engage the receiver.

2. The hitch component of claim 1, wherein the tube has a substantially rectangular cross section, and wherein the two piston apertures extend through an upper wall of the tube.

3. The hitch component of claim 1, wherein the first and second pistons are threadably attached to the transversely movable wedge block.

4. The hitch of component of claim 1, wherein the first and second pistons each comprise a cylindrical member having an aperture, and a bolt that extends through the aperture and threadably engages the transversely movable wedge block.

5. The hitch component of claim 1, wherein the ball mount comprises steel and the wedge members comprise aluminum.

6. The hitch component of claim 1, wherein the bolt comprises a head that extends out of the tubular insert that includes a security feature.

7. The hitch component of claim 1, further comprising a first low friction panel disposed between the first wedge surface and the third wedge surface, and a second low friction panel disposed between the second wedge surface and the fourth wedge surface.

8. The hitch component of claim 7, wherein the low friction panel comprises an ultrahigh molecular weight polyethylene.

9. The hitch component of claim 1, wherein the longitudinally adjustable wedge block further comprises a plurality of ribs disposed opposite the first and second wedge surfaces.

10. The hitch component of claim 1, further comprising a locking pin configured to be inserted through the receiver aperture, the pair of aligned hitch apertures, and the channel defined by the first and second recesses to releasably lock the hitch component to the receiver.

* * * * *